US009348147B2

(12) United States Patent
Smithwick

(10) Patent No.: US 9,348,147 B2
(45) Date of Patent: May 24, 2016

(54) SPINNING FAN MIRROR BEAM COMBINER FOR A BORDERLESS SELF-CONTAINED PEPPER'S GHOST

(71) Applicant: DISNEY ENTERPRISES, INC., Burbank, CA (US)

(72) Inventor: Quinn Y. Smithwick, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 238 days.

(21) Appl. No.: 14/190,955

(22) Filed: Feb. 26, 2014

(65) Prior Publication Data
US 2015/0241712 A1 Aug. 27, 2015

(51) Int. Cl.
G02B 27/22 (2006.01)
G03B 21/28 (2006.01)
G03B 21/56 (2006.01)

(52) U.S. Cl.
CPC .......... *G02B 27/2292* (2013.01); *G02B 27/225* (2013.01); *G02B 27/2285* (2013.01); *G03B 21/28* (2013.01); *G03B 21/562* (2013.01)

(58) Field of Classification Search
CPC .......... G02B 27/2292; G02B 27/2285; G02B 27/225; G02B 27/2221; G02B 27/22; G03B 21/28; G03B 21/56; G03B 21/562
USPC ................. 353/10; 359/478, 479; 472/60, 61; 352/48, 49, 86
See application file for complete search history.

(56) References Cited

U.S. PATENT DOCUMENTS

| 5,936,767 | A | 8/1999 | Favalora | |
| 6,481,851 | B1* | 11/2002 | McNelley | G02B 27/2292 345/5 |
| 7,016,116 | B2 | 3/2006 | Dolgoff | |
| 2003/0223043 | A1* | 12/2003 | Yoshino | H04N 13/0495 353/10 |
| 2011/0249087 | A1 | 10/2011 | Tsang et al. | |
| 2012/0062846 | A1 | 3/2012 | Dike | |

OTHER PUBLICATIONS

Bimber, et al., "Alternative Augmented Reality Approaches: Concepts, Techniques, and Applications" Eurographics, 2003.
Gerhardt, Ryan "Optical Illusion Mirror Blends People Together—PSFK" retrieved from http://www.psfk.com/2013/06/mirror-blends-faces-together.html#!r6pAF on Jan. 13, 2014.

* cited by examiner

*Primary Examiner* — William C Dowling
*Assistant Examiner* — Ryan Howard
(74) *Attorney, Agent, or Firm* — Marsh Fischmann & Breyfogle LLP; Kent A. Lembke

(57) ABSTRACT

A 3D display apparatus for providing a Pepper's Ghost effect. The apparatus includes a background set spaced apart from a viewing space such that a viewer in the viewing space has a line of sight to the background set. The apparatus also includes a mirrored surfaces fan, which includes a motor, a hub rotatable by the motor, and a plurality of fan blades attached in a spaced apart manner to the hub to rotate with the hub. In some cases, each of the fan blades has a reflective region on a side facing away from the background set. The apparatus also includes a display device with a screen displaying an image of an object. The screen is positioned at an offset angle in the range of 40 to 60 degrees from a rotation plane for the sides of the fan blades. Often, the display device includes a 3D autostereoscopic device.

32 Claims, 6 Drawing Sheets

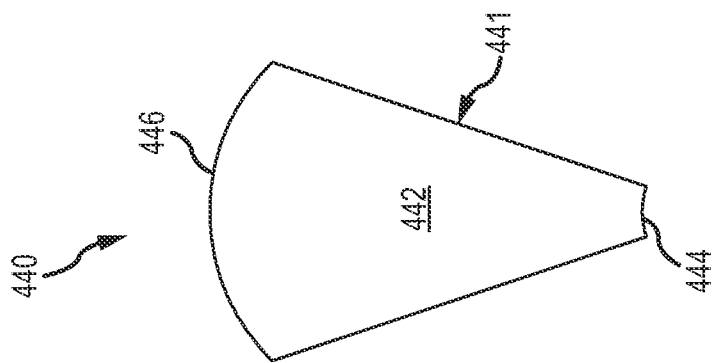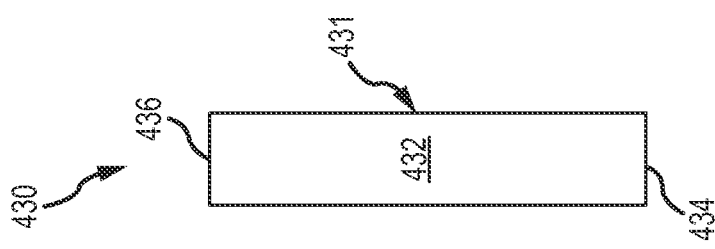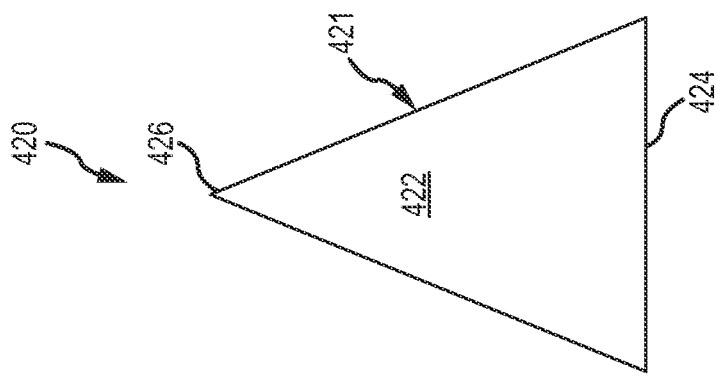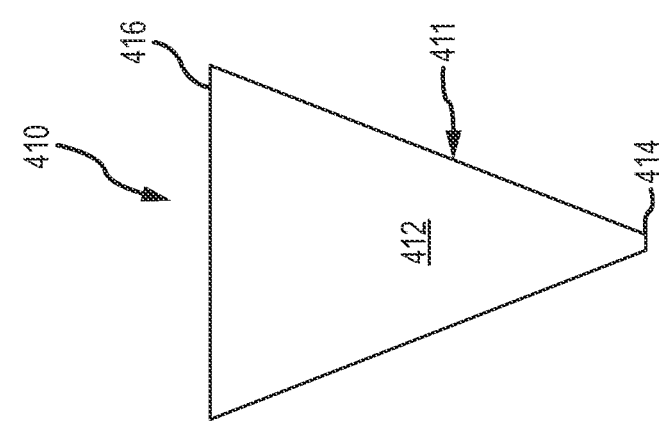

SPINNING FAN MIRROR BEAM COMBINER FOR A BORDERLESS SELF-CONTAINED PEPPER'S GHOST

BACKGROUND

1. Field of the Description

The present invention relates, in general, to displays providing a three dimensional (3D) effect without use of special glasses such as, but not limited to, a Pepper's Ghost display, and, more particularly, to displays (or display assemblies) and display methods that are adapted to provide a borderless, self-contained Pepper's Ghost illusion without allowing a viewer to see or identify the beam combiner or a support/frame for such a beam combiner.

2. Relevant Background

There are numerous settings where it is desirable to create a unique visual display. For example, theme or amusement parks may include rides or walk-through attractions where guests (or "viewers") are entertained by a unique visual effect or illusion. Pepper's Ghost is an illusionary technique used by magicians, by ride or attraction designers, and others to produce a 3D illusion of a latent or ghost-like image. Using a simple piece of plate glass and special lighting techniques, conventional Pepper's Ghost systems can make objects appear and disappear within a scene or a room.

Generally, these systems include a main room or scene that is readily viewed by a viewer and also include a hidden room that is not directly visible to the viewer. Both rooms are typically identical in their physical structure except that the hidden room may include additional objects or characters such as a ghost or other character. A large piece of glass or a half-silvered mirror may be situated between the viewer and the scene at an angle, such as at about 45 degrees. When the main room is lit and the hidden room is darkened, the viewer only sees the main room as the hidden room does not reflect from the glass. The sheet of glass is itself hard to see as it typically is quite large so that it extends across the entire view of the main room.

Pepper's Ghost (e.g., the character in the hidden room) then becomes very visible to the viewer when the entire hidden room or portions such as the ghost or other character are brightly lit. Since only a portion of the light cast upon the ghost or other objects in the hidden room is reflected from the glass, the reflected images appear as latent or ghostly images relative to the objects in the main room, e.g., the reflected images or images superimposed in the visible room may appear to float. The Pepper's Ghost image is a 3D image that may be a still image or animation may be provided such as with animatronics providing the "ghost" or by placing a live actor in the hidden room. The image has a definitive location in the set and behaves with correct parallax, focus, and vergence cues; however, it does not exhibit occlusion. In a broad sense, the Pepper's Ghost systems may be thought of as a method of displaying 3D images that can be viewed without the use of headgear or glasses on the part of the user.

FIG. 1 illustrates a traditional layout for a Pepper's Ghost display assembly 100 for use in creating a 3D display 150 for a viewer 102. The assembly 100 includes a display scene or real world set 110, a background/backdrop 114, and a foreground/floor 112. Physical objects (not shown), such as pieces of furniture that a "ghost" may walk among, may be provided on the floor/foreground 112 of the set 110. The assembly 100 also includes a large second space or room 120 that is reflected, when illuminated, into the real world set 110 by a beam combiner 130 as shown with reflected image 150.

A sheet or piece of glass (e.g., a beam splitter) 130 is positioned at an angle, θ, (e.g., 45 degrees) between the scene 110 and the expected or planned position of the viewer 105 (or the viewer's point of view (POV)) or an outer display surface/window. The beam combiner 130 may be glass or another transmissive/reflective material such as Mylar or the like and be supported in a frame 132. The beam combiner 130 is at least partially transparent such that the foreground 112 and the backdrop 114 are visible through the beam combiner 130 as light (shown as a display on a screen of an animated or still character 123) from a 3D display 122 (in this example) travels through the beam combiner 130 to the viewer or viewer's eyes 105. The display device 122, such as a typical 2D monitor, a 3D display, a physical object, or a hidden room/scene that can be selectively lit, is provided in the display assembly 100 and is used to display an image 150 such as the 3D virtual character shown in FIG. 1.

The Pepper's Ghost effect is highly popular and is an effective illusion for placing virtual objects in a real world scene. The technique often involves use of a half-silvered Mylar or glass plate mirror (also called a beam combiner as discussed above with reference to FIG. 1) to visually combine the reflection of a monitor and the pass-through view of the real world/physical set. Typically, a large beam combiner must be used such as one that is room sized so that the edges of the mirror and frame are off stage and not visible to viewers or a members of an audience.

As will be appreciated, the conventional Pepper's Ghost assembly design can be problematic for a number of reasons. The glass mirror or beam combiner has to be huge and thick (if unsupported) so that it is very heavy and may sag, thereby distorting the reflected image. In some cases, the mirror film may be relatively thin but must be held taut. Then, a frame that is opaque and visible has to be provided in the physical set. Also, the beam combiner or mirror effectively divides the physical set or real world room in two, which severely limits the physical space available to the effect designer as half the room or set space cannot be used (e.g., the space between the beam combiner a viewing glass (not shown in FIG. 1) separating the set from the viewer).

In practice, the weight, expense, and installation difficulty of conventional Pepper's Ghost assemblies can cause challenges. Further, the size of the mirror is often much larger than the effect or displayed virtual character itself. For example, the virtual character may only occupy a small area in the middle of the room-sized set. A room-sized beam splitter cuts the room in half, which prevents, in the case of an amusement park ride, the ride vehicle from traveling in a circuitous path around the room or set. This division by the beam combiner also interferes with set pieces or props. A second space that often matches the size of the real world or physical set is being reflected so when a large room-sized beam splitter is used in a Pepper's Ghost assembly the second space must be equally large even if the virtual character is relatively small (e.g., see smaller character 150 in large set 110 in FIG. 1). Smaller beam combiners are not used because you have to hide the frame and also the beam combiner edges from view in the real world set.

There remains a need for improved visual display techniques and systems such as for creating or projecting/displaying 3D images. Some attempts to replace or modify conventional Pepper's Ghost assemblies have been proposed, but these only provided 2D or flat images and include display elements that were readily visible to the viewer, which harmed the illusion.

SUMMARY

To address these and other problems with prior 3D displays, a display assembly (and associated method of operation) is described that provides a self-contained Pepper's Ghost illusion. The display assembly may be relatively small (or larger if desired) rather than being room sized as was the case with conventional Pepper's Ghost assemblies. The display assembly is "self-contained" in that it may be placed within a real world or physical set without requiring a second, separate room. The display assembly does not divide the available space into two as a large beam combiner is not required but, yet, no frame or support for a display element (or edges of the display element or a beam combiner) is visible to a viewer during operation of the display assembly to provide a virtual object (e.g., a still or animated character, a virtual prop, and so on) in a real world or physical set.

The inventor created the display assembly in response to a request for an illusion that would provide a floating holographic transmission-like 3D image of a virtual character in the middle of a physical set. The virtual character was to be about three feet tall in a very large set (e.g., a space that was 45 feet by 45 feet by 15 feet). The inventor recognized that a conventional Pepper's Ghost assembly (such as that shown in FIG. 1) would not work in this case because there was no room for a large beam splitter and further recognized that scrim projection was not practical because the scrim would be revealed by other special effects (e.g., laser beams). The display assembly designed by the inventor and taught herein addresses these challenges and is operable to produce a virtual character that is 3D with volume rather than being a flat 2D image while retaining the magic of the illusion by not revealing display surfaces or support structures.

More particularly, a virtual object display assembly is provided for use with a background set or physical set to provide a Pepper's Ghost illusion or effect. The display assembly includes a mirrors imaging assembly that is operable to intermittently and repeatedly present first a reflective region and second a transparent region, whereby the background set is viewable through the transparent region and is blocked from view by reflective region. The display assembly also includes a display device directing light associated with an object toward the reflective region (e.g., by lighting a 2D or 3D object or displaying a still or motion image of an object/character), whereby the light associated with the object is intermittently reflected into a viewing space.

In some implementations, the mirrors imaging assembly includes a mirrored surfaces fan with a motor and a hub rotated by the motor about a rotation axis (e.g., at a rate to avoid flicker such as to provide a reflective surface near the display device 15 to 30 times per second). In such implementations, the mirrored surfaces fan may further include a number of spaced apart fan blades each having a body with a side facing toward the viewing space and containing a reflective surface. Each of the fan blade bodies may be triangular shaped with a first end attached to the hub and a second wider end spaced apart from the hub. In these particular cases, the second wider end can be arcuate or scalloped to blend reflected light with the background in a desired manner.

In some embodiments, the mirrored surfaces fan may have a duty cycle of blade area to transparent area in the range of 30 to 70 percent, with a higher duty cycle chosen to increase the opacity of the displayed virtual object (and vice versa). In some cases, at least a subset of the fan blades includes a diffuse surface along with the reflective surface on the side of the body facing toward the viewing space. Then, a projector may be used for projecting light onto the diffuse surfaces of the fan blades when they are rotated by the motor about the rotation axis, whereby a two dimensional image is viewable in a plane through which the fan blades rotate. In the same or other cases, the display device is a 2D or 3D display device with a screen operable to be illuminated to provide the light associated with the object. To provide a Pepper's Ghost effect, the screen of the display device and the side of the fan blade body defines an offset angle in the range of 40 to 50 degrees.

BRIEF DESCRIPTION OF THE DRAWINGS

FIGS. 4A-4D illustrated side views (views of the mirrored/reflective sides) of four different embodiments of mirrored fan blades that may be used with a mirrored surfaces fan to implement a Pepper's Ghost display assembly according to the present description;

DETAILED DESCRIPTION

Figure 1:
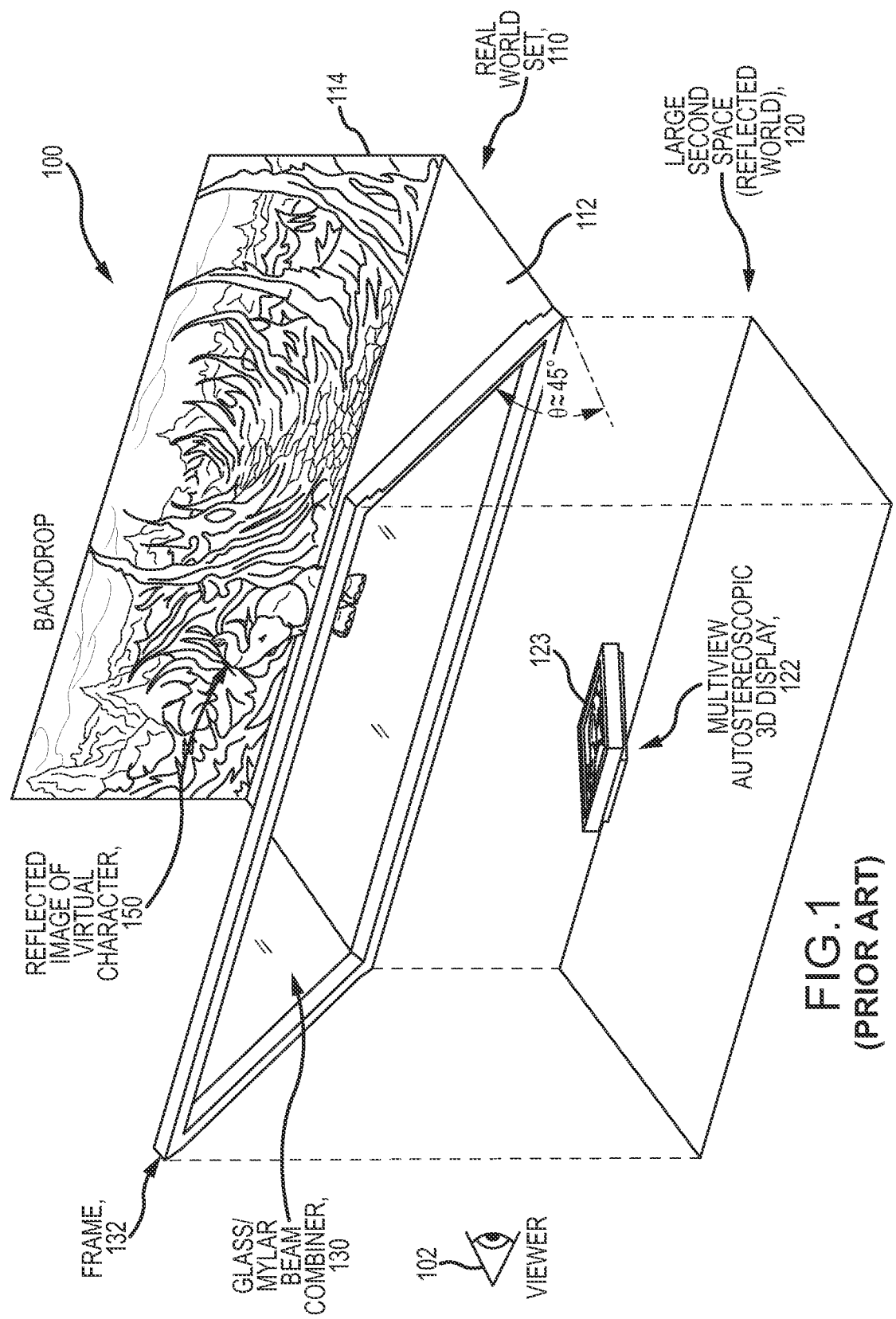
FIG. 1 illustrates a traditional Pepper's Ghost display assembly being used to display a virtual character within a real world or physical set.

Briefly, it was recognized by the inventor that a Pepper's Ghost display assembly could be provided by projecting light (such as from a 2D or 3D display device's screen) onto intermittent mirrors. In other words, the projection surface is configured to alternate rapidly over time between a reflective surface and a transparent surface such that the projected light from the display device's screen is reflected to a viewer when the reflective surface is present and the physical set provided behind the projection surface is visible when a transparent surface is positioned between the viewer the background physical set (or when the reflective surface is moved out of the viewer's line of sight).

A Pepper's Ghost illusion is achieved by placing a lit object or 3D or 2D monitor screen at an offset angle (such as 40 to 50 degrees with 45 degrees being useful in many cases) in a space in the foreground (toward the viewer or viewing space) to the intermittently presented mirrors. These mirrors may be reflective or mirrored surfaces provided on the face of fan blades facing the viewer or viewing space, and the fan may be operated to rotate these reflective or mirrored surfaces through the viewer's line of sight to the background physical scene or set. The viewer alternatively sees the reflected object or image of the 2D or 3D monitor screen that is reflected from the mirrored surfaces and the background set. Because the mirrored surfaces (fan blade bodies) are opaque, structural or strengthening components may be provided on the opposite side of the blade body from the mirrored surface such that the blade bodies may be quite large (a length of 1 to 5 feet or the like) without ruining the Pepper's Ghost effect by having a visible support frame.

The amount of transparency (or opacity) of the displayed virtual object (e.g., an animated character or set prop) can be defined by selecting the duty cycle of the spinning mirrors imaging assembly. The duty cycle may be thought of as the amount of reflective surface compared to the amount of transparent surface or space that is provided between the reflective surfaces. For example, the duty cycle may be 50/50 with the space being the same size and shape of the fan blades (or their reflective surfaces).

If it is desirable that the displayed virtual object be more transparent, narrow fan blades/reflective surfaces may be used, and these blades may be moved relatively slowly. Typically, in this regard, the rotation rate of the fan motor will be high enough to limit flicker in the displayed virtual object such as to place a mirrored surface (fan blade) between the viewer and the background 15 to 30 times per second. In some cases, the blade bodies may be shaped similar to a pie wedge or sector (growing in width from the rotation axis to an outer periphery or outer edge) with the spaces being of equal size (e.g., each sector may be a 60 degree wedge to provide three fan blades and three equally sized spaces between reflective or mirrored surfaces). Straight fan blade bodies with correspondingly shaped mirrored surfaces may be used (or the width may actually decrease with radial distance from the rotation axis of the fan motor) to vary the transparency of the displayed virtual object with its location/displayed position along the radius of the mirrored surface (e.g., more space/transparency would be provided the further the projected light was from the rotation axis of the fan motor).

The outer edges of the fan blade bodies may be flat or linear or the edges may be scalloped or arcuate. The "spaces" may be filled with a transparent material in some embodiments. A spiral support element could be provided interconnecting the blade bodies and extending across the spaces without significant harm to the visual effect (e.g., each point on the spiral support element(s) only passes once per rotation of the fan motor which limits its visibility to a viewer).

In addition to reflecting images from the mirrored blade surfaces, projection can be off of a diffusive element or surface provided on or adjacent the mirrored surface on the fan blade body. For example, the mirrored surface may not cover the entire fan blade body, but it may reveal a diffuse surface at the fan blades leading and trailing edge(s). Light (from a projector or the like) may be projected onto the fan blades from an angle differing from that of the 2D or 3D display or location of the lit object such as by projecting onto the spinning fan blade from above when a 3D display device is positioned below the spinning fan blades.

The diffusive or dispersive elements/surfaces provide a small projection "screen" at the edge to provide a second plane to display imagery. This may allow foreground imagery (e.g., sparks, fire, or other special effects) relative to the displayed virtual object, which appears to the viewer to be closer to the background set than the images displayed on the diffusive elements/surfaces. In other cases, the projector may simply project onto the reflective surfaces where dust or other particles would act to disperse light toward the viewer or viewing space. In both of these cases, a 2D projection or projected image can be scattered to be visible with the reflected 3D (or 2D in some cases) virtual object reflected from the mirrored fan blades, to act like an intermittent mirror and screen and/or to act like a beam splitter and also a scrim.

Figure 2:
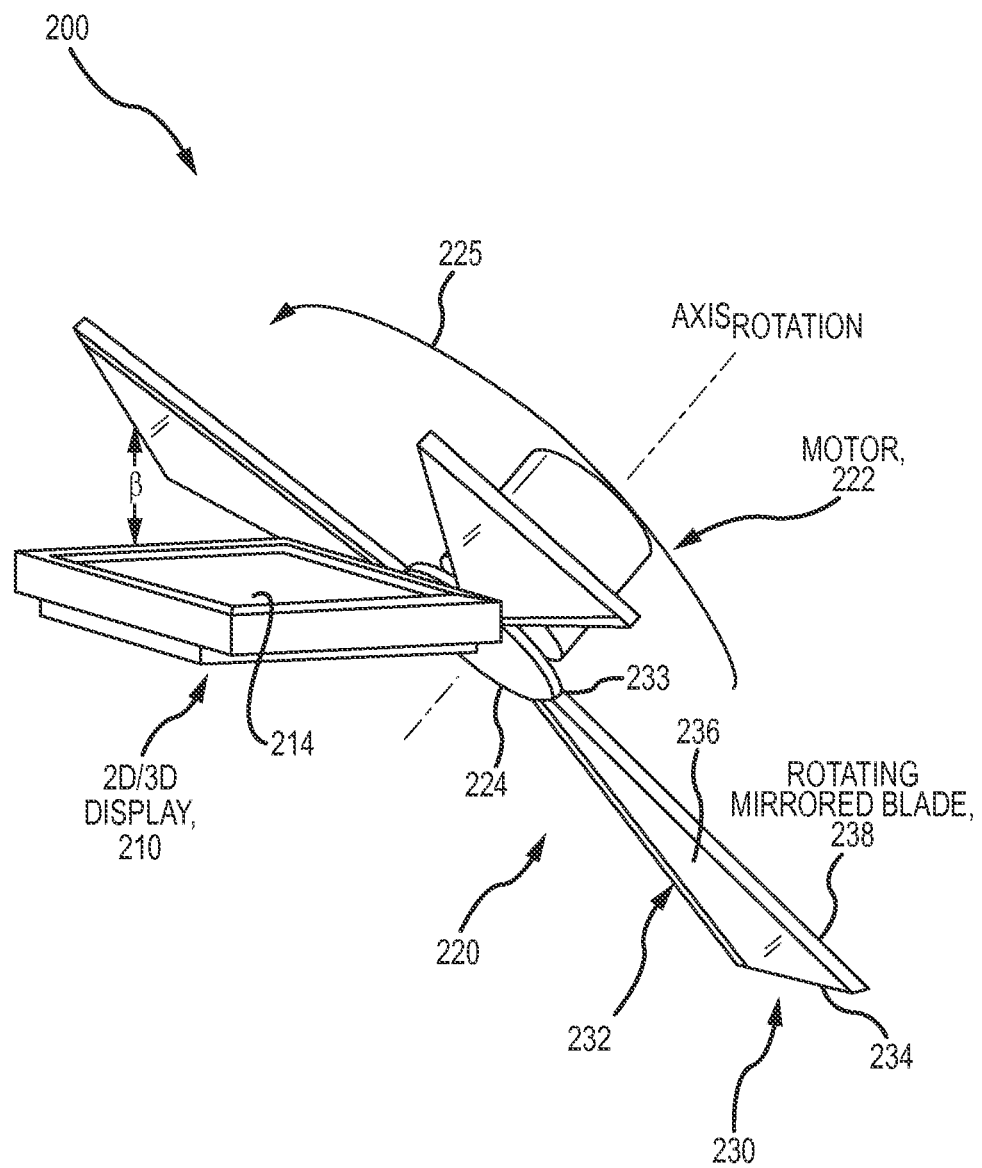
FIG. 2 illustrates a spinning mirrors imaging assembly of one embodiment useful in a Pepper's Ghost display assembly.

FIG. 2 illustrates a spinning mirrors imaging assembly (or spinning fan mirror beam combiner) 200 of one embodiment of the present description that may be used in Pepper's Ghost display assemblies to reflect an autostereoscopic (e.g., a 3D image without need for special eyewear) or volumetric image. As shown, the assembly 200 includes a 2D and/or 3D display device 210 with a display screen 214, and, during operations, a 2D or 3D image such as of a character is displayed in a 3D set or physical scene (real world set). The display device 210 may take the form of a liquid crystal display (LCD) device, but it can take nearly any form to project light and may even be replaced with an assembly to provide a lighted object (as in conventional Pepper's Ghost display).

The imaging assembly 200 also includes a mirrored surfaces fan 220. This fan 220 includes a motor 222 that rotates a hub or core piece 224 about an axis of rotation, $Axis_{Rotation}$, as shown with arrow 225. The rotation rate is chosen to achieve a desired illusion or effect. For example, it may be desirable to eliminate flicker in the displayed image, and, in this case, the rotation rate would be selected in a range of revolutions per minute (RPM) to cause an image to be reflected 15 to 30 times per second (e.g., to place a mirrored fan blade in front of the display screen 214 twenty-five times per second or the like).

A set or number of fan blades is affixed to the rotatable hub 224. Three pie wedge or triangular shaped blades are shown by a smaller or larger number may be used, and the shape may be varied. Each blade 230 has a body 232 attached at a first or inner end 233 to the core/hub 224 and extending out to a second or outer end 234 (with a pair of edges/sides 238 extending between ends 233, 234). A space or void is provided between each adjacent pair of the blades 230, and this void/space may have the same size and shape as the blades, but this is not required as using a smaller space would increase opacity and using a larger space would increase transparency of a displayed virtual object with the display device 210.

The blade body 232 is shown to be planar and to include a reflective or display side 236 facing or proximate to the display device 210. Significantly, the display side 236 is formed of a reflective material or is otherwise adapted to be reflective, e.g., a mirror or a layer of reflective material may be attached to the side 236 of the body 232. The blades 230 are mounted and/or the fan hub 224 arranged relative to the display screen 214 such that the mirrored sides/surface 236 is at an offset angle, β, when the blades 230 pass next to the screen 214. This offset angle, β, may be in the range of 40 to 50 degrees with 45 degrees being useful in many applications.

The fan blades 230 or, more accurately, the mirrored sides 236 are canted at an angle, β, such as 45 degrees from the plane of the screen 214 so that the sides 236 reflect light from 2D or autostereoscopic display device 210 (e.g., light from device 210 is reflected by the rotating 225 blades 230). In some embodiments, the mirrored surfaces/sides 236 are 100 percent reflective (and opaque), but, because the blades 230 are spinning 225 with hub 224, a viewer looking at the spinning blades 230 alternately sees the reflection of the display screen 214 and a real world set positioned behind the assembly 200 (e.g., on the side of the fan 220 opposite the display device 210). If the alternating views occur quickly enough, the two views merge in the mind of the viewer, and the spinning bladed mirror assembly 200 acts as a beam combiner.

The effective percent of reflection can be controlled by the ratio of the width of the blades (or mirrored sides 236) versus the empty space (or spaced filled with transparent material) between the blades. This may be thought of as the fan's duty cycle. The reflection can be controlled and varied from the center (rotation axis, $Axis_{Rotation}$, of the fan motor 222) to the edge 234 of each blade 230 by varying the duty cycle or the blade and/or empty space/void width. A spatially varying beamsplitter allows the effect to be blended into the background without an abrupt change in brightness. Similarly, the blades may be different lengths or shapes to provide additional or different blending of the viewed images (the reflected image and the directly viewed background set/scene).

Figure 3:
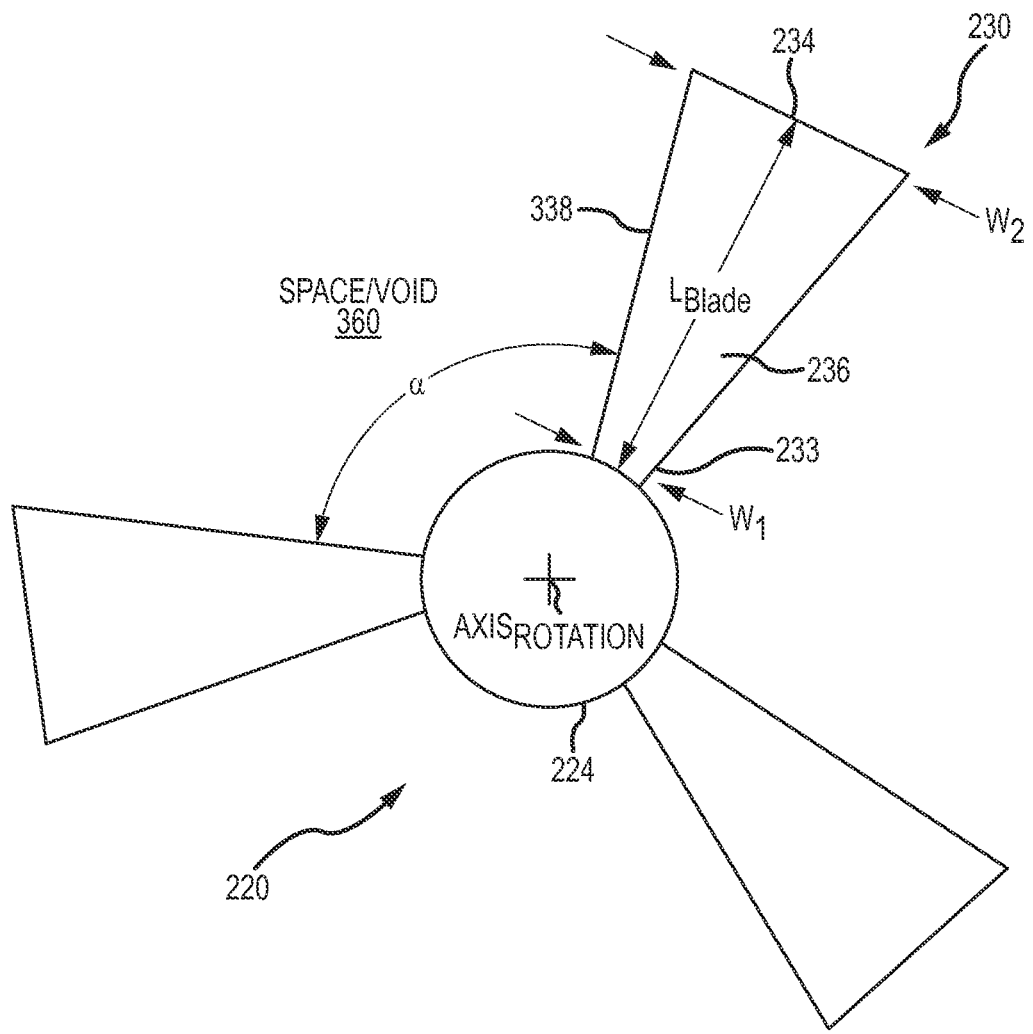
FIG. 3 is an end view of the exemplary mirrored surfaces fan of the spinning mirrors imaging assembly of FIG. 2 illustrating additional features or design parameters of the fan.

FIG. 3 illustrates an end view of one exemplary embodiment of the mirrored surfaces fan 220 of the assembly 200 of FIG. 2 providing more detail of the fan 220 and its components. Each blade 230 has a body 232 with a mirrored surface or side 236 that would be positioned to face a viewer or toward a viewing space at an offset or canted angle (such as 45 degrees), which allows the display surface or screen (e.g., screen 214 of display 210) to be hidden from view. The blade 230 has a length, $L_{Blade}$, as measured from the first/inner end 233 to the second/outer end 234 of the body 232 (and mirrored surface 236), and this may be varied significantly to practice the present invention such as several inches up to many feet (e.g., 3 inches up to 12 feet or more).

The blade's body 232 or its mirrored surface 236 may have a shape that is defined as having a first width, $W_1$, measured at the first end 233 and a second width, $W_2$, measured at the second end 234 (across the mirrored surface 236 in this embodiment). These two widths, $W_1$ and $W_2$, may be equal for a straight or rectangular-shaped blade, which causes transparency to increase with radial distance from the rotation axis, $Axis_{Rotation}$, or the transparency may be further increased with radial distance by having the outer width, $W_2$, be less than the inner width, $W_1$ (e.g., an inverse pie wedge or triangular shape). As shown, though, the blade's mirrored surface 236 is pie shaped or triangular shaped to provide a relatively consistent transparency/opacity with radial distance with the outer width, $W_2$, being greater than the inner width, $W_1$. The widths may range from less than one inch up to several feet (or more).

The space or void 360 (which may also be filled fully or partially with a transparent material) between sides/edges 338 of adjacent pairs of the blades 230 defines the amount of transparency to a background physical set or scene. The space/void 360 may be the same size and shape as the blades 230 as shown in FIG. 3 or may differ to provide more or less transparency. The size of the space/void 360 may be defined by the angle, α, defined by the edges/sides 338 extended to meet at the rotation axis, $Axis_{Rotation}$. In the illustrated case of FIG. 3, the space/void 360 is defined by the angle, α, of about 60 degrees (e.g., a circle divided into six equal pieces provides three blades 230 and three 60 degree voids/spaces 360).

FIGS. 4A-4D each illustrates a shape that may be used to implement the spinning mirrored fan blades of the present description. In FIG. 4A, a blade 410 is provided with a body 411 that has a pie-shaped reflective/mirrored surface 412 with a first or inner side 414 (which would be attached to a fan hub/core) that has a smaller size (width) than a second or outer side 416. In FIG. 4B, a blade 420 is provided that also has a pie-shaped or triangular-shaped reflective/mirrored surface 422 on the blade body 421. However, the first or inner side 424 (which would be attached to the fan core/hub) has a larger size (width) than the second or outer side 426 of the surface 422, which in practice makes the displayed virtual object be more transparent with increasing distance from the core/hub center (rotation axis of the fan).

FIG. 4C illustrates a fan blade 430 with a body 431 having a rectangular-shaped mirrored/reflective surface 432 extending between a first or inner side 434 and a second or outer sided 436. As shown, the two sides 434 and 436 have equal widths. The result of the use of the narrow blades 430 would be a displayed virtual object that would have more transparency with increased radial distance (e.g., the portion of the object reflected from portions of the surface 432 nearer to the outer edge 436 would appear more transparent than those reflected from the surface 432 near edge 434). FIG. 4D illustrates a pie-shaped blade 440 with a body 441 having a reflective surface 442 that is generally pie or triangular shaped as inner edge 444 is much smaller than the outer edge 446. The blade 440 differs from blade 410, though, because the outer edge 446 is arcuate in shape (or could be scalloped in some embodiments), which may be useful for creating a desired blending of the reflected light from the surface 442 and/or tips 446 with viewing of the background set and its physical props.

The blades may also be curved like cross-sections of a sphere or paraboloid (rather than flat) so that when the blades are spun/rotated they create an intermittent spherical/parabolic mirror. Objects/displays reflected in the intermittent spherical mirror are optically relayed to form a real image in front of the mirror (rather than forming a virtual image behind a flat mirror), while still allowing the background set to be observed. The blades or surfaces may also be made of flexible reflective/semi-transparent material such that by rapidly rotating the blades, centripetal acceleration (aka centrifugal forces) makes the reflective/semi-transparent surface make a planar or spherical shaped and intermittent mirror. The curvature of the mirror and, thus, its focal length and position of real (or virtual) images can be controlled and varied by the speed of the rotation.

Figure 5:
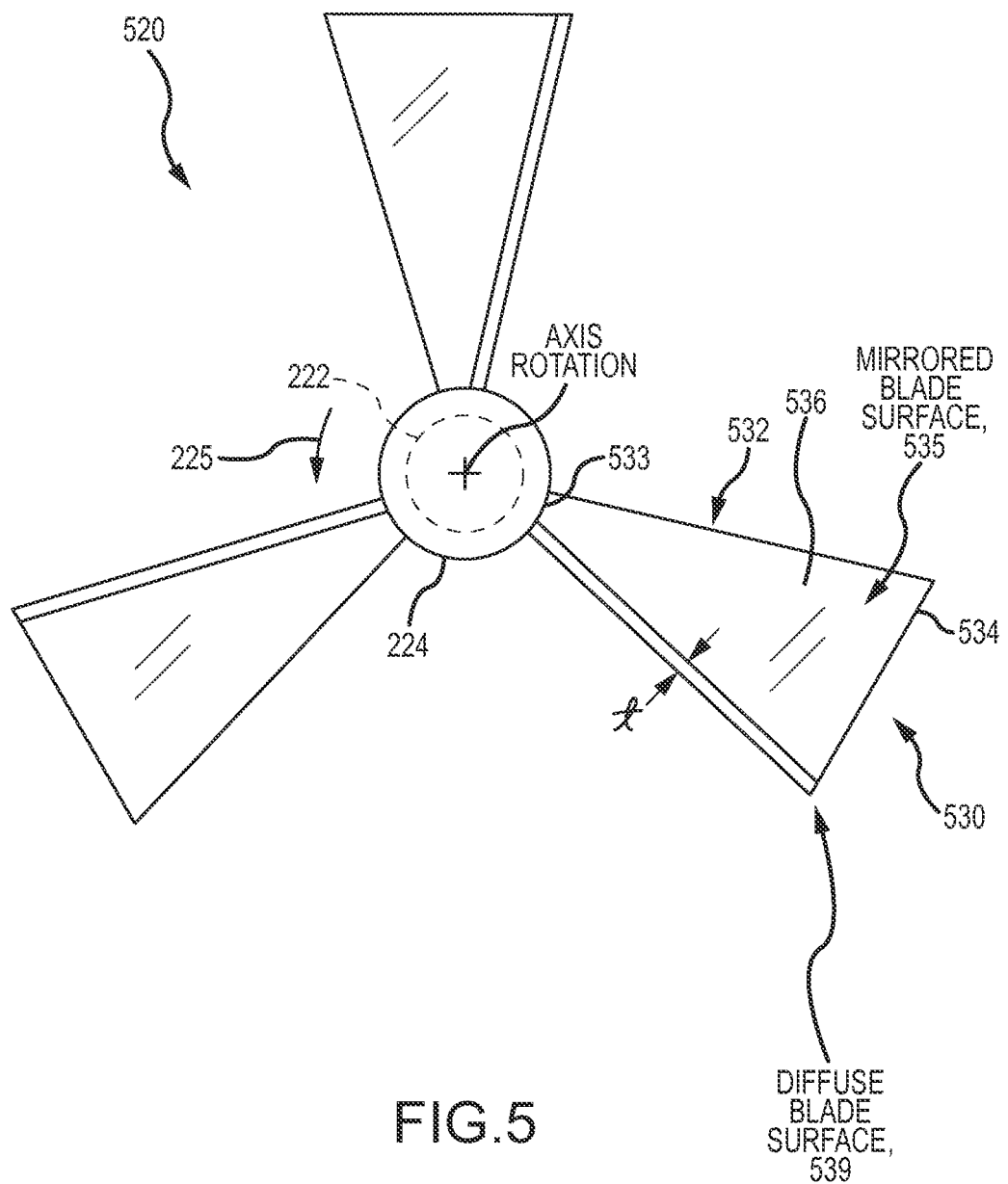
FIG. 5 illustrates an end view similar to that of FIG. 3 showing an embodiment of a mirrored surfaces fan, for use with a spinning mirrors imaging assembly, that combines a diffuse surface or region with a mirrored blade surface or region to facilitate projection of a two dimensional (2D) image onto the fan blades.

FIG. 5 is an end view of another embodiment of a mirrored surfaces fan 520 that may be used in a spinning mirrors imaging assembly (such as that shown in FIG. 2 and like reference numbers are used for like components). The fan 520 includes a motor 222 and has a mounting core/hub 224 that is rotated by the motor 222 about a rotation axis, $Axis_{Rotation}$. To the hub 224, a number/set of fan blades 530 are mounted in a spaced apart manner (e.g., reflective/opaque surfaces and transparent voids/spaces (or materials) are alternated about the periphery of the rotatable hub 224).

The fan 520 differs from fan 220 of FIG. 2 in that a diffuse surface/region is combined with the reflective surface/region on the exposed blade side to facilitate concurrent projection of a 3D image (onto the reflective surface) and a two dimensional (2D) image onto the spinning fan blades. As shown, each fan blade 530 has a body 532 that is attached at a first or inner end 533 to the hub 224 and extends out from the hub 224 to a second or outer end 534. In this case, the body 532 is shaped like a triangle or pie wedge (as are the spaces/voids between the blades 530 but are much larger to increase the transparency or ghostliness of the displayed virtual 2D and 3D images with the fan 520). As discussed earlier, the shape of the fan body 530 and its size may be varied to practice the invention.

The blade body 532 has an imaging or display side 536, and, during use, the fan 520 would be arranged such that the side 536 faces a viewer or a viewing space (e.g., the blades 530 may rotate in a canted or offset plane relative to horizontal such as at a 45 degree angle relative to horizontal or to a display screen hidden from the viewer). The imaging/display side 536 is divided into two surfaces or regions. The first and typically much larger is a mirrored blade surface 537, which is covered with or provided by highly reflective material. The second and much smaller is a diffuse blade surface 539, and, in this regard, the body 532 may be painted or simply be left exposed (e.g., the material of the body may be visible in the diffuse blade surface 539). The diffuse blade surface 539 has a thickness, t, that may be a fraction of the width of the side 536 such as less than about 10 percent (which may coincide with a thickness, t, of less than several inches such as 0 to 1 inches). The diffuse surface 539 may be provided at any location on the side 536 but often will be provided along a leading or trailing edge and extend the length of the side 536 from the inner side 533 to the outer side 534 of the blade body 532.

Figure 6:
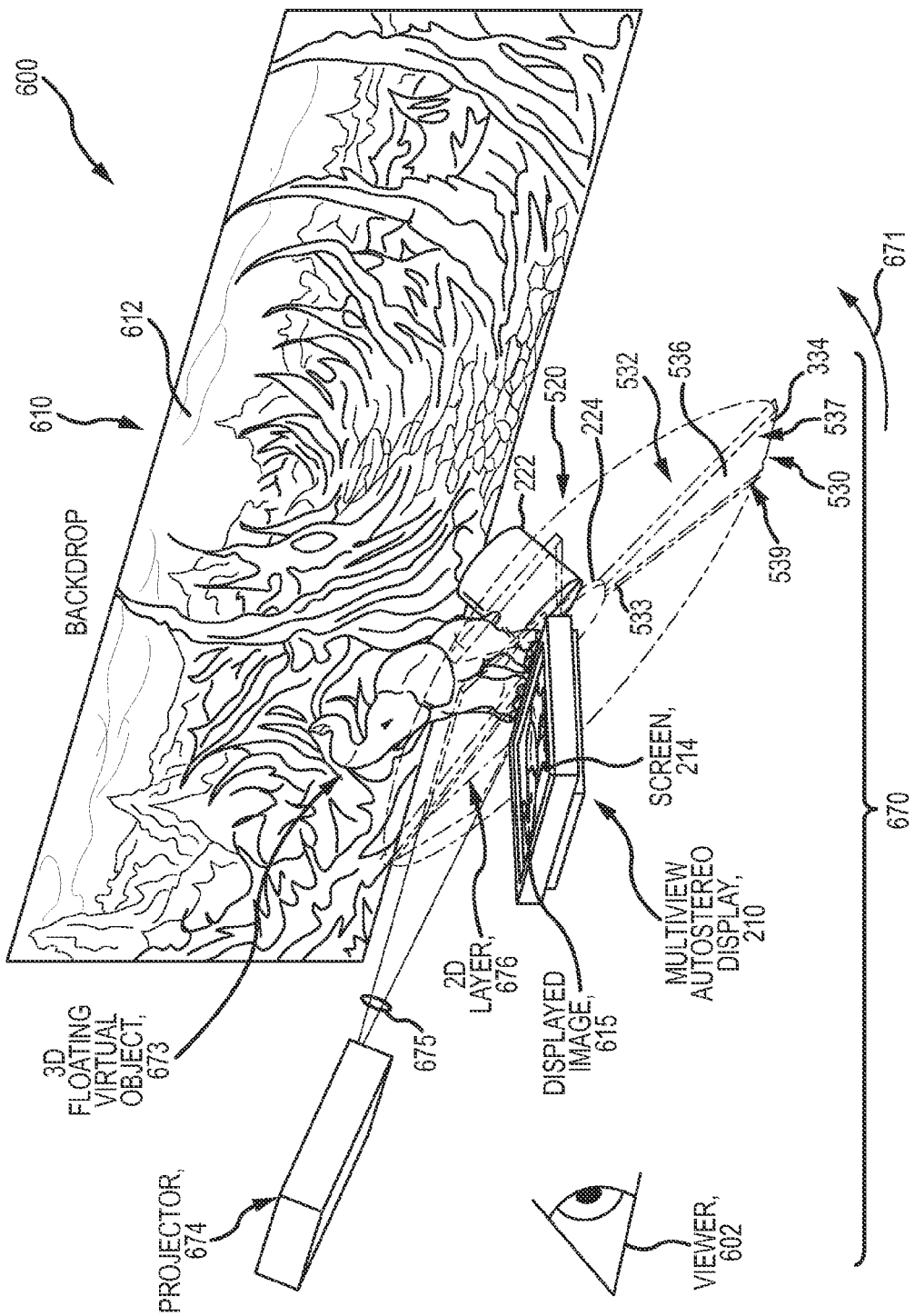
FIG. 6 illustrates a simplified or partial perspective view of a Pepper's Ghost display assembly of the present description using the mirrored surfaces fan of FIG. 5 along with components of the spinning mirrors imaging assembly of FIG. 2 and a projector to provide a 3D floating virtual object in a real world set and to provide a 2D layer (e.g., via the diffuse surfaces or regions on the mirrored fan blades).

FIG. 6 illustrates a perspective view of a Pepper's Ghost display assembly 600 of one embodiment during its use to concurrently display a background set 610, a 3D virtual object (an animated character or the like) 673, and a 2D foreground image or display layer 676 to a viewer 602. The viewer 602 is in a viewing space spaced some distance apart from a backdrop or physical set element 610 that is shown to be showing a still or motion image 612 on an exposed screen or surface (note, the physical set may include more than one backdrop/display screen and may also include physical props).

A spinning mirrors imaging assembly 670 is positioned in the space between the backdrop/physical set 610 and the viewer 602/viewing space. The imaging assembly 670 includes the mirrored surfaces fan 520 shown in FIG. 5 and described in detail above. Further, the multiview autostereoscopic display device 210 of FIG. 2 is included and positioned such that the display screen 214 faces the canted rotating blades 530 of the fan 520. The display 210 is shown to be operating to provide light in the form of a displayed image 615 in the screen 214. This light is reflected to the viewer 602 by the reflective surfaces 537 on the side 536 of each blade 530 when the blade 530 rotates to a position adjacent to the screen 214 (e.g., between the screen 214 and the backdrop 610). The intermittent reflection of this light from screen 214 of image 615 causes the viewer 602 to perceive the virtual object 673 at a location behind the rotating blades 530 (e.g., closer to the backdrop/physical set 610).

The imaging assembly 670 also includes a projector 674 that is positioned above the fan 520 to project downward onto the blades 530 and the diffusive surface 537 on the blade body side 536. The projector 674, blades 530, and screen 214 locations may be changed such that the projector 674 projects from below or from a side in some applications. The projector 674 projects light 675 onto the spinning fan blade 530 and the diffuse surface/region 539. The light 675 is dispersed such that a 2D image or layer 676 is visible to the viewer 602 in the plane of the rotating blades 530 or in front of the virtual object 673 and the backdrop image/props 612.

The display assembly 600 thus provides a borderless, self-contained Pepper's Ghost with displayed virtual object 673. The blade structure of the fan 520 is self-supporting (so no visible support frame). There are no edge highlights, and the display assembly 600 provides variable reflectivity that can be used by illusion designers to provide brightness blending. The displayed images can be provided as or in two independent layers including the 3D floating image 673 and slanted 2D layer 676.

A 2D image may be projected onto the fan blades scattering off dust or sprayed particles on the blades, off a separate diffuse region (as shown in FIGS. 5 and 6), or a separate diffuse blade (e.g., some blades may be wholly reflective while one or more blades may be wholly diffuse). The light scattering or diffuse areas act as an opaque projection screen, but, as the blades rotate, the viewer alternately sees the projection and the background or physical scene. If the alternating views occur quickly enough, the views merge and the spinning diffuse screen acts as a partially transparent scrim.

The scrim and projected image are located in the plane of the mirrored/diffuse fan blades while the reflected image of the virtual character is behind the fan blade plane. The result is a semi-transparent, floating 2D canted projection layered several inches to several feet in front of a 3D virtual character/object. Autostereoscopic displays are not capable of reproducing much depth (only a foot or so), but this is enough to produce dimensional rounded virtual characters/objects. The additional 2D layer or foreground image adds more depth and dimensionality to the Pepper's Ghost effect or illusion.

Additional structures may be placed between the fan blades to provide additional support, but it preferably is not annular rings or similar structures as these would block a background view even when they rotate and, therefore, this structure would be apparent to a viewer. In contrast, a spiral support structure is possible since it only intermittently blocks the background view as it rotates. A thin clear plastic film may also be overlaid on the fan to provide support. Since the film is thin, there will be no edge highlights, and the film will be kept taut by the blades.

The inventor implemented a display assembly prototype that included a spinning mirrors imaging assembly as shown in FIG. 2 with an 8 foot by 8 foot fan. The fan included 20 blades each with a mirrored surface on one side. The fan included a motor to spin the large blades at 60 RPM. The display assembly was used to reflect a 48-inch 3D autostereo display while concurrently displaying a second layered image that was projected from an LCD projector onto the blades where dust dispersed enough light to provide a foreground 2D image. The number of blades and the rotation rate were chosen to provide the desired fifty percent transparent apparent mirror and flicker-free image, while maintaining a safe blade tip speed.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the mirrored blades or surfaces could be provided to pendulate (e.g., move like a pendulum to swing back and forth) or reciprocate (move back and forth) rather than rotate about a rotation axis.

The spinning mirror fan is reflective so that the virtual character may be three dimensional either using a physical 3D object that is illuminated or using an autostereoscopic 3D display. The spinning mirror fan may also have intermittent diffuse projection sections, which allows it to have an additional 2D layer in front of the 3D (or 2D if desired) reflection. The spinning mirror fan does not have edge highlights, which could betray its presence. Because the mirror is bladed and spins, the edges are only intermittently visible, and the blade may be opaque and the edges may be light absorbing. The blade tips also do not need to be knife edged to avoid edge highlights.

The thickness of a glass combiner whether spinning or not is selected for it to be self supporting (a frame is undesirable as it would be visible) especially if at a canted 45-degree angle. Besides making the assembly heavy, the thickness of the glass would create a noticeable optical shift in the background due to refraction. The thick glass would also sag under its own weight, resulting in a distorted reflected image. In contrast, the spinning mirror fan described herein is bladed and spins, and the blades and edge are only intermittently visible. The blades can be made of stiff, lightweight material (e.g., a carbon fiber blade body) and have an I-beam, ribbed cross section, or other support structures to be self-supporting even for moderate sizes.

The transparency of the spinning mirror blades may be made to vary with distance from the center by changing the duty cycle of the blade/space widths so that the transparency may vary from 50 percent to 100 percent as an image is projected closer and closer to the outer end/edge of the blade. This allows for a smoother blending from the effect into the background without an abrupt change in brightness at the mirror edge.

I claim:

1. A virtual object display assembly for use with a background set, comprising:
   a mirrors imaging assembly operable to intermittently and repeatedly present first a reflective region and second a transparent region, whereby the background set is viewable through the transparent region and is blocked from view by reflective region; and
   a display device directing light associated with an object toward the reflective region, whereby the light associated with the object is intermittently reflected into a viewing space,
   wherein the mirrors imaging assembly comprises a mirrored surfaces fan with a motor and a hub rotated by the motor about a rotation axis and wherein the mirrored surfaces fan further comprises a number of spaced apart fan blades each having a body with a side facing toward the viewing space and containing a reflective surface.

2. The display assembly of claim 1, wherein each of the fan blade bodies is triangular shaped with a first end attached to the hub and a second wider end spaced apart from the hub.

3. The display assembly of claim 2, wherein the second wider end is arcuate.

4. The display assembly of claim 1, wherein the mirrored surfaces fan has a duty cycle of blade area to transparent area in the range of 30 to 70 percent.

5. The display assembly of claim 1, wherein at least a subset of the fan blades each includes a diffuse surface along with the reflective surface on the side of the body facing toward the viewing space.

6. The display assembly of claim 5, further comprising a projector projecting light onto the diffuse surfaces of the fan blades when rotated by the motor about the rotation axis, whereby a two dimensional image is viewable in a plane through which the fan blades rotate.

7. The display assembly of claim 1, wherein the fan blades each comprises a curved blade body whereby rotation of the fan blades by the motor creates an intermittent spherical mirror or an intermittent parabolic mirror.

8. The display assembly of claim 1, wherein the fan blades each comprises a blade body formed of flexible reflective or semi-transparent material whereby rotation of the fan blades by the motor causes the flexible blade bodies to extend outward via centripetal acceleration to form an intermittent mirror.

9. The display assembly of claim 1, wherein the display device comprises a 2D or 3D display device with a screen operable to be illuminated to provide the light associated with the object.

10. The display assembly of claim 9, wherein the screen of the display device and the side of the fan blade body defines an offset angle in the range of 40 to 50 degrees.

11. A 3D display apparatus, comprising:
    a background set spaced apart from a viewing space, wherein a viewer in the viewing space has a line of sight to the background set;
    a mirrored surfaces fan comprising a motor, a hub rotatable by the motor, and a plurality of fan blades attached in a spaced apart manner to the hub to rotate with the hub, wherein each of the fan blades has a reflective region on a side facing away from the background set; and
    a display device with a screen displaying an image of an object, wherein the screen is positioned at an offset angle in the range of 40 to 60 degrees from a rotation plane for the sides of the fan blades.

12. The apparatus of claim 11, wherein the display device comprises a 3D autostereoscopic device.

13. The apparatus of claim 11, wherein the mirrored surfaces fan has a blade to space duty cycle of greater than about 40 percent.

14. The apparatus of claim 11, further comprising a projector projecting light onto the side of the fan blades, whereby a 2D image is dispersed toward the viewing space.

15. The apparatus of claim 14, wherein a diffuse region is provided adjacent the reflective region on one or more of the fan blades to provide an intermittent projection screen for the projector.

16. The apparatus of claim 15, wherein the motor rotates at a rate to provide a reflective region between the display device screen and the background set at least 15 times per second.

17. The apparatus of claim 11, wherein the fan blades each comprises a curved blade body whereby rotation of the fan blades by the motor creates an intermittent spherical mirror or an intermittent parabolic mirror.

18. The display assembly of claim 11, wherein the fan blades each comprises a blade body formed of flexible reflective or semi-transparent material whereby rotation of the fan blades by the motor causes the flexible blade bodies to extend outward via centripetal acceleration to form an intermittent mirror.

19. The display assembly of claim 18, wherein a speed of the rotation of the fan blades is selected to be within a predefined range to control a curvature of the formed, intermittent mirror, whereby the speed of the rotation defines a focal length and a position of displayed real or virtual images.

20. A virtual object display method, comprising:
    illuminating a 3D object or operating a display device to provide an image of the 3D object on a display screen;
    intermittently passing one or more reflective surfaces at an offset angle in the range of 40 to 60 degrees past the illuminated 3D object or the display screen with the image of the 3D object; and
    projecting a 2D image onto the reflective surfaces when the reflective surfaces pass the display screen or illuminated 3D object, whereby light is dispersed by particles on the reflective surfaces.

21. A virtual object display method, comprising:
    illuminating a 3D object or operating a display device to provide an image of the 3D object on a display screen;
    intermittently passing one or more reflective surfaces at an offset angle in the range of 40 to 60 degrees past the illuminated 3D object or the display screen with the image of the 3D object;
    intermittently passing one or more diffuse surfaces past the illuminated 3D object or the display screen; and
    concurrently projecting a 2D image onto the diffuse surface when the diffuse surfaces are proximate to the illuminated 3D object or the display screen.

22. A virtual object display method, comprising:
    illuminating a 3D object or operating a display device to provide an image of the 3D object on a display screen; and
    intermittently passing one or more reflective surfaces at an offset angle in the range of 40 to 60 degrees past the illuminated 3D object or the display screen with the image of the 3D object, wherein the intermittently passing is performed with a spinning mirrors fan including fan blades with a side covered at least partially with a reflective material.

23. A virtual object display assembly for use with a background set, comprising:
a mirrors imaging assembly operable to intermittently and repeatedly present first a reflective region and second a transparent region, whereby the background set is viewable through the transparent region and is blocked from view by reflective region; and
a display device directing light associated with an object toward the reflective region, whereby the light associated with the object is intermittently reflected into a viewing space,
wherein the display device comprises a 2D or 3D display device with a screen operable to be illuminated to provide the light associated with the object.

24. The display assembly of claim 23, wherein the mirrors imaging assembly comprises a mirrored surfaces fan with a motor and a hub rotated by the motor about a rotation axis and wherein the mirrored surfaces fan further comprises a number of spaced apart fan blades each having a body with a side facing toward the viewing space and containing a reflective surface.

25. The display assembly of claim 23, wherein the mirrors imaging assembly comprises a mirrored surfaces fan with a motor and a hub rotated by the motor about a rotation axis, wherein the mirrored surfaces fan further comprises a number of spaced apart fan blades each having a body with a side facing toward the viewing space and containing a reflective surface, and wherein each of the fan blade bodies is triangular shaped with a first end attached to the hub and a second wider end spaced apart from the hub.

26. The display assembly of claim 25, wherein the second wider end is arcuate.

27. The display assembly of claim 23, wherein the mirrors imaging assembly comprises a mirrored surfaces fan with a motor and a hub rotated by the motor about a rotation axis, wherein the mirrored surfaces fan further comprises a number of spaced apart fan blades each having a body with a side facing toward the viewing space and containing a reflective surface, and wherein the mirrored surfaces fan has a duty cycle of blade area to transparent area in the range of 30 to 70 percent.

28. The display assembly of claim 23, wherein the mirrors imaging assembly comprises a mirrored surfaces fan with a motor and a hub rotated by the motor about a rotation axis, wherein the mirrored surfaces fan further comprises a number of spaced apart fan blades each having a body with a side facing toward the viewing space and containing a reflective surface, and wherein at least a subset of the fan blades each includes a diffuse surface along with the reflective surface on the side of the body facing toward the viewing space.

29. The display assembly of claim 28, further comprising a projector projecting light onto the diffuse surfaces of the fan blades when rotated by the motor about the rotation axis, whereby a two dimensional image is viewable in a plane through which the fan blades rotate.

30. The display assembly of claim 23, wherein the mirrors imaging assembly comprises a mirrored surfaces fan with a motor and a hub rotated by the motor about a rotation axis, wherein the mirrored surfaces fan further comprises a number of spaced apart fan blades each having a body with a side facing toward the viewing space and containing a reflective surface, and wherein the fan blades each comprises a curved blade body whereby rotation of the fan blades by the motor creates an intermittent spherical mirror or an intermittent parabolic mirror.

31. The display assembly of claim 23, wherein the mirrors imaging assembly comprises a mirrored surfaces fan with a motor and a hub rotated by the motor about a rotation axis, wherein the mirrored surfaces fan further comprises a number of spaced apart fan blades each having a body with a side facing toward the viewing space and containing a reflective surface, and wherein the fan blades each comprises a blade body formed of flexible reflective or semi-transparent material whereby rotation of the fan blades by the motor causes the flexible blade bodies to extend outward via centripetal acceleration to form an intermittent mirror.

32. The display assembly of claim 23, wherein the screen of the display device and the side of the fan blade body defines an offset angle in the range of 40 to 50 degrees.

* * * * *